Dec. 7, 1948. I. N. HEWITT 2,455,580
AXIALLY SHIFTING TYPE, PEDESTAL
MOUNTED, TIRE REMOVING MACHINE
Filed May 26, 1945

INVENTOR.
IVAN N. HEWITT
BY Martin E. Anderson
ATTORNEY.

Patented Dec. 7, 1948

2,455,580

UNITED STATES PATENT OFFICE 2,455,580

AXIALLY SHIFTING TYPE, PEDESTAL MOUNTED TIRE REMOVING MACHINE

Ivan N. Hewitt, Medicine Lodge, Kans.

Application May 26, 1945, Serial No. 596,043

2 Claims. (Cl. 157—6)

This invention relates to improvements in machines for removing tires from rims.

Tires, especially those used for trucks and tractors, are large and heavy and frequently remain on the rims for a long time. The rims employed are mostly of the type known as "demountable rims" that permit the tires to be removed by a sliding motion transversely of the rim.

It is found that automotive tires of the type to which this relates, frequently adhere very strongly to the rim due to rust and other causes and that for the removal of such tires, special tools must be employed.

It is the object of this invention to produce a tire removing tool that can be employed with tires of different sizes and which shall be so constructed that it will employ both direct pressure and impact for the purpose of releasing the tire casing and removing it from the rim.

The principal object of this invention is to produce a tire removing machine or device of such construction that it employs both a hydraulic, or other suitable, mechanism for exerting a gradual and uniform pressure and in addition has such a construction that certain releasing tools can be moved circumferentially and subjected to hammer blows for the purpose of releasing short sections of the tire at a time.

Another object is to produce a tool for the purpose described in which the tire can be quickly removed from the machine and replaced by another.

The above and other objects that may become apparent as the description proceeds are attained by means of a construction and an arrangement of parts that will now be described in detail, and for this purpose reference will be had to the accompanying drawing, in which the invention has been illustrated in its preferred form, and in which.

Figure 1:
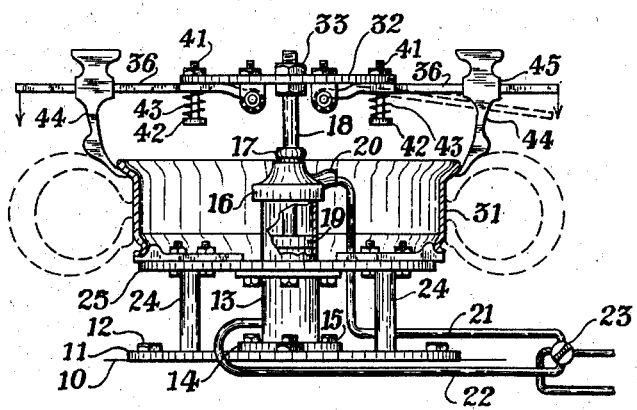
Figure 1 is a view partly in side elevation and partly in section taken along line 1—1, Figure 2, and having parts thereof broken away to further disclose the construction.

In the drawing reference numeral 10 designates a supporting floor surface and reference numeral 11 designates the base of the machine which is secured to the floor by means of bolts 12 or other equivalent means. In the drawing the base has been illustrated as circular, but may be of any other shape. Secured to the upper surface of the base is a hydraulic cylinder 13, provided with a circular flange 14. The cylinder is bolted to the base by means of tap screws 15. The upper end of the cylinder is provided with a removable cap 16 that has a stuffing box 17 through which the piston rod 18 extends. A piston 19 is secured to the lower end of the piston rod. Cap 16 is provided with a tubular lug 20 to which one end of the oil pressure line 21 is connected. Another oil pressure pipe is connected with the cylinder below the piston and this has been designated by reference numeral 22. Pipes 21 and 22 extend to a 4-way valve 23 that controls the flow of liquid from a pump which has not been shown. It is evident that when liquid is introduced through pipe 22, piston 19 will move upwardly and when liquid is introduced through pipe 21, it will move the piston downwardly.

Figure 5:
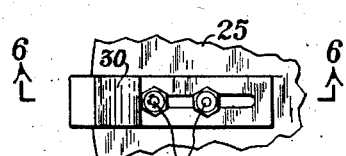
Figure 5 is a fragmentary top plan view showing the construction of the adjustable supporting bars.
Figure 6:
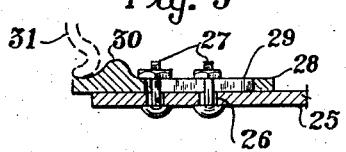
Figure 6 is a section taken on line 6—6, Figure 5.

Secured to the base and extending upwardly therefrom are a plurality of supports 24, to the upper ends of which a circular rim supporting plate 25 is secured. Plate 25 is provided with four pairs of openings like those designated by reference numeral 26 in Figure 6, for the reception of bolts 27. Rim supporting bars 28 are provided with slots 29 for the reception of the bolt and are also provided adjacent their outer ends with short upwardly extending stops 30. It is evident from an inspection of Figures 5 and 6 that bars 28 may be adjusted radially by loosening bolts 27 and after the bars have been positioned as desired, may be clamped in position by the bolts. A tire rim 31 is positioned on the outer ends of bars 28 as shown most clearly in Figure 1. The tire casing has been indicated by broken lines.

In the drawing the rim supporting members have been shown as quite low or of the shape used with removable rims. Where the rims are secured to disk wheels, the supporting members extend upwardly to a greater height than shown in the drawing.

Figure 2:
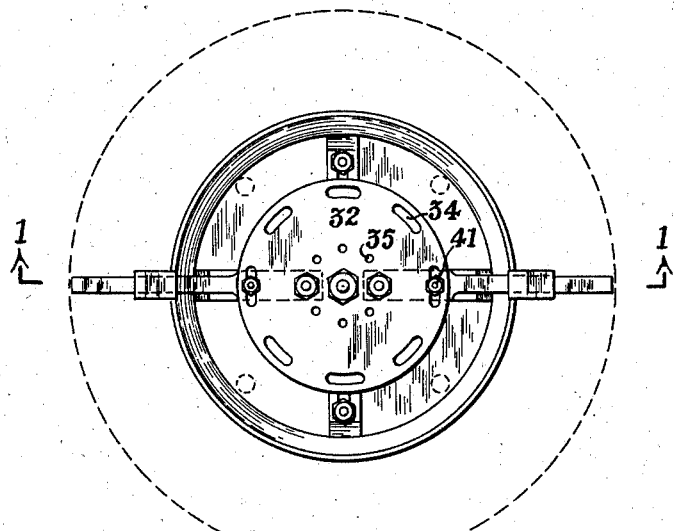
Figure 2 is a top plan view of the machine shown in Figure 1.
Figure 7:
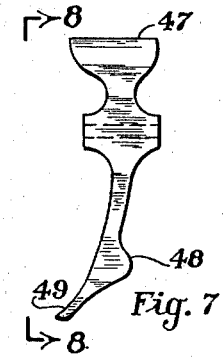
Figure 7 is a side elevation of one of the chisel fingers.
Figure 8:
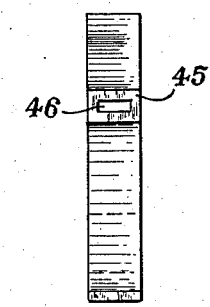
Figure 8 is an elevation looking in the direction of arrows 8—8, Figure 7.

Secured to the top of the piston rod is a pressure plate 32 that is held in position by means of nut 33. Pressure plate 32 is provided with elongated openings 34 positioned forty-five degrees apart, as shown in Figure 2 and with holes 35 in radial alignment with openings 34.

Figure 3:
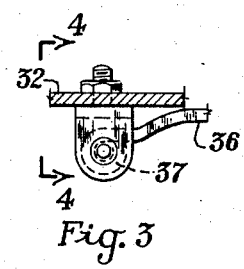
Figure 3 is a section showing the manner of securing one of the pressure arms in position.
Figure 4:
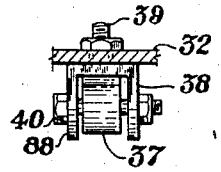
Figure 4 is a section taken on line 4—4, Figure 3.

Carried by the pressure plate are a number of pressure arms 36, two such arms being shown in the drawing. Pressure arms 36 are preferably quite massive and may be heavier and of greater cross section than indicated in the drawing, the size and strength being optional. The inner end of each arm is provided with a loop like that indicated by reference numeral 37 in Figure 3. This loop is positioned between the downwardly extending lugs 38 of a U-shaped member whose base has an upwardly extending bolt 39 that projects through one of the holes 35 in plate 32. It will be evident that the pressure arms 36 may be turned about the axis of bolt 39 and also about the pivot 40 that extends through the loop 37. Each pressure arm is provided with a hole for the reception of a bolt 41 that extends through one of the openings 34. Bolts 41 have heads 42 and positioned between the heads and the under surface of the pressure arms are springs 43. It will be observed that springs 43 exert a pressure tending to hold the bars against the under surface of plate 32 in the manner shown in Figure 1.

The specific construction employed for pivotally connecting the pressure arms to the pressure plate may, of course, be replaced by any suitable equivalent construction, since the object is to hinge or pivot the pressure arms to the plate in such a manner that they will respond readily to the impact of a hammer.

Each of the pressure arms is provided with a pressure finger. These fingers have an enlarged portion 45 provided with an opening 46 of the proper size and shape to receive the pressure bars. The upper end of each pressure finger has a head 47 that receives the hammer blows during the operation. Each pressure finger is also provided with an enlargement 48 that can be engaged by a hammer for the purpose of forcing point 49 into the space between the upper flange of the rim and the tire casing as shown in Figure 1. During operation the pressure arms and fingers are shifted rotatably about the axis of the piston rod and short sections of the tire casing are loosened at each operation. After loosening has been effected, the arms are rotated to new positions. Springs 43 are of sufficient strength to lift the arms and chisel fingers.

After the tire casing has been loosened, oil under pressure is introduced into the cylinder above piston 19, exerting sufficient downwardly pressure thereon to slide the casing downwardly and remove it from the rim. After the casing has been loosened and removed, the 4-way valve is reversed, moving the piston upwardly whereupon the tire rim and tire can be removed and replaced by another.

This machine can also be employed in forcing a tire casing onto a rim, it being then necessary to reverse the rim from the position shown in Figure 1.

In the drawing a hydraulic jack mechanism has been shown for exerting a downward pull on the pressure plate 32. It is to be understood that any other suitable jack mechanism can be substituted provided it operates in substantially the same way and produces the same result. A screw jack like that shown in U. S. Patent 1,564,496, or a rack and pinion mechanism similar to that shown in U. S. Patent 1,178,481 may be substituted if desired.

One of the important features of this improvement resides in the construction that makes it practical to employ impact to release the casings. This is due to the fact that arms 36 are pivoted and held against the under surface of plate 32 by resilient means; this permits each arm to move downwardly independently of the others as indicated by dotted lines in Figure 1.

Arms 36 may also turn slightly about bolts 39 due to the arcuate holes 34.

Bars 29 are adjustable for different sizes of rims.

Particular attention is called to the construction of the pressure fingers 44 and to the fact that they have their lower ends curved in such a manner that they will fit all different flanges; they are also of such length that they fit all widths of tire rims.

Pressure fingers are also readily removable and can be used and sold as hand tools for loosening the tire casing. Extra pressure fingers are supplied. It is to be understood that as many as eight arms 36 can be used. Pressure can be applied by means of the jack and fingers 44. Hand tools comprising fingers 44 can be used to loosen the casing at points between arms 36. A heavy hammer applied to tool 44 will start the casing moving after which pressure exerted by the jack will finish the removal.

The pressure fingers are radially adjustable and have been shown as slidably or telescopically mounted on arms 36. Any equivalent construction can, of course be substituted.

Due to the projections 48 and the heads 47 the pressure fingers are especially well adapted to be used with a hammer for loosening the tire.

The rim supporting plate 25 has been shown as supported above base 11. This construction is for the purpose of bringing the rim supporting plate to a convenient height. Supports 24 may be reduced in length to any extent desired and base 11 and supports 24 may be entirely omitted, if desired.

Having described the invention, what is claimed as new is:

1. A tire removing and replacing device of the type described, having a base adapted to rest on and be secured to a floor, a rim supporting table positioned above the base and supported by the latter, a pressure jack mechanism secured to the base and extending to a point above the table, said jack mechanism having two relatively movable members one of which is attached to the base and the other movable vertically, a pressure plate secured to the upper end of the movable jack member, a plurality of pressure bars secured to the under surface of the pressure plate in radial position, the inner ends of said bars being connected for vertical pivotal movement, the pressure plate having an opening for each pressure bar, bolts extending through the openings and through the bars, a resilient means associated with the bolts and bars for exerting forces tending to raise the bars and hold them against the under surface of the plate while permitting downward pivotal movement in response to hammer blows, and downwardly extending pressure fingers mounted on the pressure bars for radial adjustment.

2. A rim supporting table, a plurality of rim supporting members secured thereto for radial adjustment, a pressure jack mechanism having one part attached to said table and a movable member positioned above the table, a pressure plate connected with the movable jack member, a plurality of pressure bars positioned underneath the pressure plate in angularly spaced relation, each bar having a pivotal connection with the pressure plate permitting it to move downwardly, a spring connecting each bar with the pressure plate, forming means for holding it normally in face to face relation with the under surface of the plate, and pressure fingers connected with the bars for longitudinal adjustment.

IVAN N. HEWITT.

REFERENCES CITED

The following references are of record in the file of this patent:

UNITED STATES PATENTS

| Number | Name | Date |
|---|---|---|
| 522,651 | Cole | July 10, 1894 |
| 1,538,875 | Stevens | May 19, 1925 |
| 1,564,496 | Staugaard | Dec. 8, 1925 |
| 1,720,615 | Welch | July 9, 1929 |
| 1,724,813 | Weaver et al. | Aug. 13, 1929 |
| 2,034,819 | Maulis | Mar. 24, 1936 |
| 2,043,169 | Hawkinson | June 2, 1936 |